(12) United States Patent
Lease

(10) Patent No.: US 10,683,175 B1
(45) Date of Patent: Jun. 16, 2020

(54) BI-DIRECTIONAL VIBRATORY CONVEYOR APPARATUSES AND METHODS OF USING THE SAME

(71) Applicant: R&D Vibratory Conveyors LLC, Spring Grove, IL (US)

(72) Inventor: Daniel T. Lease, Spring Grove, IL (US)

(73) Assignee: R&D Vibratory Conveyors LLC, Spring Grove, IL (US)

( * ) Notice: Subject to any disclaimer, the term of this patent is extended or adjusted under 35 U.S.C. 154(b) by 0 days.

(21) Appl. No.: 16/383,941

(22) Filed: Apr. 15, 2019

(51) Int. Cl.
  *B65G 27/32* (2006.01)
  *B65G 27/20* (2006.01)
  *B65G 27/16* (2006.01)

(52) U.S. Cl.
  CPC .......... *B65G 27/32* (2013.01); *B65G 27/16* (2013.01); *B65G 27/20* (2013.01)

(58) Field of Classification Search
  CPC ........ B65G 27/32; B65G 27/12; B65G 27/14; B65G 27/16; B65G 27/18; B65G 27/20; B65G 27/22; B65G 27/24; B65G 27/26; B65G 25/00; B65G 25/04; B65G 25/06; B65G 25/065
  USPC ....................................................... 198/753
  See application file for complete search history.

(56) References Cited

U.S. PATENT DOCUMENTS

| | | | | |
|---|---|---|---|---|
| 2,697,357 A | * | 12/1954 | Wettlaufer | B07B 1/286 74/87 |
| 5,794,757 A | * | 8/1998 | Svejkovsky | B65G 27/12 198/750.1 |
| 5,816,386 A | * | 10/1998 | Carlyle | B65G 27/14 198/768 |
| 5,944,170 A | * | 8/1999 | LaVeine | B65G 27/32 198/751 |
| 6,029,796 A | * | 2/2000 | Musschoot | B65G 27/20 198/753 |
| 6,230,875 B1 | * | 5/2001 | Carlyle | B65G 27/22 198/761 |
| 7,735,633 B2 | | 6/2010 | Kraus | |
| 9,238,229 B1 | * | 1/2016 | Kempf | B02C 19/16 |

* cited by examiner

*Primary Examiner* — Mark A Deuble
(74) *Attorney, Agent, or Firm* — Scherrer Patent & Trademark Law, P.C.; Stephen T. Scherrer; Monique A. Morneault

(57) ABSTRACT

Bi-directional vibratory conveyor apparatuses comprise an elongated horizontal conveying surface, a vibration inducing motor, and vertically-disposed legs under the horizontal conveying surface, the deflection of which via one or more deflector in conjunction with vibrations of the horizontal conveying surface by the vibration inducing motor induces directional travel of parts on the horizontal conveying surface based on the direction of deflection of the legs thereebeneath. Methods of using the same are further provided.

24 Claims, 5 Drawing Sheets

BI-DIRECTIONAL VIBRATORY CONVEYOR APPARATUSES AND METHODS OF USING THE SAME

TECHNICAL FIELD

The present invention relates to bi-directional vibratory conveyor apparatuses. Specifically, vibratory conveyor apparatuses of the present invention comprise an elongated horizontal conveying surface, a vibration inducing motor, and vertically-disposed legs under the horizontal conveying surface, the deflection of which via one or more deflectors in conjunction with vibrations of the horizontal conveying surface by the vibration inducing motor induces directional travel of parts and material on the horizontal conveying surface based on the direction of deflection of the legs therebeneath. Methods of using the same are further provided.

BACKGROUND

Vibratory conveyors are generally known for moving material along a horizontally disposed conveying surface. Typically, such a system is useful for moving parts, products, particles, or other like material, from one location to another, such as in a factory, warehouse, or other industrial setting. In many cases, typical conveyor belts cannot be used to move these types of articles due to the size of the material. Oftentimes, smaller parts, products or particles may fall off or into the mechanism moving the conveyor belts, causing damage to the systems. Moreover, conveyor belts tend to easily wear over time, requiring replacement, and impacting time and costs to do so.

Vibratory conveying surfaces solve problems associated with moving parts, products, particles and/or other material that would otherwise be difficult to move over conveyor belt systems. A vibratory conveying surface typically comprises a horizontally-disposed surface, typically made from solid metal. Oftentimes, the surface is an elongated tray with sidewalls to prevent the parts, products, particles or other like material from falling off as it moves over the surface. A vibration is typically induced on the surface, and forces associated with the vibration typically move the material in one direction or the other.

Various mechanisms have been proposed and are used to induce directional movement of material along horizontal surfaces. In one example, the horizontal surface is supported by a plurality of springs, and a pair of vibration inducing motors is designed to impact the horizontal surface, inducing vibrations in one direction or another. Specifically, a first motor, typically having an eccentric weight for inducing the vibration on the surface, is mounted to a slat at approximately 45 degrees to the bed, angled rightwardly, and a second motor having an eccentric weight for inducing vibration on the surface is mounted to a slat at approximately 45 degrees to the bed, angled leftwardly. Activation of the first motor induces vibrations pitched rightwardly and activation of the second motor induces vibrations pitched leftwardly on the horizontal surface. By controlling the first and second motors, movement of material is induced in one direction or the other.

However, the use of two or even more motors to induce movement of material via vibration along a horizontal surface can be loud, use significant amounts of power, and require significant amounts of space to mount of the multiple motors. The use of multiple motors can lead to increased risk of failure and may be costly to replace.

Various proposals exist to solve some of the problems associated with vibratory conveyor systems. Specifically, to reduce motor size, energy requirements and associated costs, a single motor is proposed to induce vibratory movement of material along a horizontal surface. Specifically, U.S. Pat. No. 6,029,796 describes the use of a single motor and a system of isolation springs. The motor, having an eccentric weight thereon, induces vibrations in one direction or another based on its rotation. Specifically, rotating the motor in one direction induces vibratory movement of material along a horizontal surface in a first direction, while reversing the motor induces vibratory movement of material along the horizontal surface in a second direction.

The various proposals for inducing vibration often do not adequately solve the problems associated therewith. Specifically, the use of a single motor may decrease energy costs, but may lessen control of the system, as the motor must be stopped then reversed to induce the desired movement of the material. In many cases, there is still the need for a large amount of space to house the motor or motors, along with the complicated spring systems necessary to induce the vibratory movement.

A need, therefore, exists for improved vibratory conveyor apparatuses. More specifically, a need exists for vibratory conveyor apparatuses that easily, efficiently, and cost-effectively induce movement of material in one direction or another along a bed or other horizontal surface. Moreover, a need exists for vibratory conveyor apparatuses that minimize space requirements, so that vibratory conveyor systems may be installed and deployed in desired locations without space constraints.

Oftentimes, the impact of the motors on the horizontal surface and the inducement of movement on material may decrease as the material moves away from the specific location of the motor and its connection to the horizontal surface. Specifically, movement of material may be greatly induced on the horizontal surface in a localized area adjacent to the point of contact of the motor on the surface. As the material moves away from the point of contact with the motor, the induced vibration on the horizontal surface is typically lessened. In some cases, material may fail to move at all as the material is displaced a certain distance from the motor. To compensate, larger and more powerful motors having increased rotation speeds may be introduced, negating cost savings and increasing space constraints.

A need, therefore, exists for vibratory conveyor apparatuses that effectively impact the entirety of the longitudinal horizontal surface. Specifically, a need exists for vibratory conveyor apparatuses that move material along the longitudinal path of the horizontal surface at the same speed, regardless of distance of the material from the motor.

In addition, heretofore prior vibratory conveyor apparatuses often require a large degree of fine-tuning to induce vibratory movement of material. Oftentimes, the vibratory movement on a bed may be impacted by the center of gravity of the system from the motor imparting vibratory forces thereto. Often, the center of gravity is set prior to the loading of the bed with material thereon. Loading material on the bed impacts the position of the center of gravity of the system, and therefore the motor must often be repositioned. The position of the motor must also be changed if the material on the bed changes.

A need, therefore exists, for vibratory conveyor apparatuses that are immune to changes caused by differences in material loading. Specifically, a need exists for vibratory conveyor apparatuses that can be set and operate the same no matter the material moving thereon.

Prior systems also attempt to control speed of material moving on the bed by increasing or decreasing the speed of the motor imparting vibratory forces to the bed, thereby requiring control of the motor. A need exists for vibratory conveyor apparatuses that are not reliant or solely reliant on the control of the speed of the vibratory motor to increase or decrease the speed of material moving on the bed. Specifically, a need exists for vibratory conveyor apparatuses that control speed by lengthening or shortening of one or more deflectors, maintaining constant speed of the vibratory motors thereon.

SUMMARY OF THE INVENTION

The present invention relates to bi-directional vibratory conveyor apparatuses. Specifically, vibratory conveyor apparatuses of the present invention comprise an elongated horizontal conveying surface, a vibration inducing motor, and vertically-disposed legs under the horizontal conveying surface, the deflection of which via one or more deflectors in conjunction with vibrations of the horizontal conveying surface by the vibration inducing motor induces directional travel of parts and material on the horizontal conveying surface based on the direction of deflection of the legs therebeneath. Methods of using the same are further provided.

To this end, in an embodiment of the present invention, a vibratory conveyor apparatus for moving material on a surface is provided. The vibratory conveyor apparatus comprises: a bed on which material is configured to move in one direction or the opposite direction; a base positioned beneath the bed; first and second legs disposed from the base to the bed; a first vibratory motor configured to impart vibrations to the bed; and a first deflector connected to the bed, configured to move the bed in the one direction or the opposite direction.

In an embodiment, lengthening or shortening of the first deflector imparts a force to the bed and, consequently, to the first and second legs causing the legs to deflect to the right or to the left, which in turn causes material to move in a first direction or a second direction depending on the direction of deflection of the legs.

In an embodiment, the first and second legs are connected to an underside of the bed.

In an embodiment, the vibratory conveyor apparatus further comprises a second deflector connected to the bed, configured to move the bed in the one direction or the opposite direction.

In an embodiment, the bed comprises a length, a first side extending vertically from flat sheet and an opposing second side extending vertically from the flat sheet.

In an embodiment, the first deflector is connected to the bed at a first angle from the base and the second deflector is connected to the bed at a second angle from the base, wherein the second angle opposes the first angle.

In an embodiment, lengthening the first deflector and shortening the second deflector causes material to move in a first direction on the bed via vibrations from the vibratory motor.

In an embodiment, shortening the first deflector and lengthening the second deflector causes material to move in the second direction on the bed via vibrations from the vibratory motor, wherein the second direction is opposite the first direction.

In an embodiment, the first deflector is a pneumatic piston.

In an embodiment, the vibratory conveyor apparatus further comprises: a second vibratory motor configured to impart vibrations to the bed.

In an alternate embodiment of the present invention, a method of moving material from one location to another is provided. The method comprises the steps of: providing a vibratory conveyor apparatus for moving material on a surface comprising a bed on which material is configured to move in one direction or the opposite direction, a base positioned beneath the bed, first and second legs extending from the base to the bed, a first vibratory motor configured to impart vibrations to the bed, and a first deflector connected to the bed configured to move the bed in a first direction or a second direction; placing material on the bed; using the first deflector to move the bed in the first direction; and imparting vibrations to the bed from the first vibratory motor, thereby moving the material on the bed in the second direction.

In an embodiment, the method further comprises: providing a second deflector connected to the bed configured to move the bed in the first direction or the second direction.

In an embodiment, the method further comprises the steps of: shortening the first deflector and lengthening the second deflector; and moving the material on the bed in the second direction, wherein the second direction is opposite the first direction.

In an embodiment, the first and second legs are connected to an underside of the bed.

In an embodiment, the bed comprises a length, a first side extending vertically from flat sheet and an opposing second side extending vertically from the flat sheet.

In an embodiment, the first deflector is connected to the bed at a first angle and the second deflector is connected to the bed at a second angle, wherein the second angle opposes the first angle.

In an embodiment, the first deflector is a pneumatic piston.

In an embodiment, the method further comprises the steps of: providing a second vibratory motor configured to impart vibrations to the bed; and imparting vibrations to the bed via the second vibratory motor.

In an embodiment, the method further comprises the step of: deflecting the first and second legs in the first direction by moving the bed in the first direction with the first deflector.

In an embodiment, the method further comprises the step of: deflecting the first and second legs in the second direction by moving the bed in the second direction with the first deflector, wherein the second direction is opposite the first direction.

It is, therefore, an advantage and objective of the present invention to provide improved vibratory conveyor apparatuses.

More specifically, it is an advantage and objective of the present invention to provide vibratory conveyor apparatuses that easily, efficiently, and cost effectively induces movement in material in one direction or another.

Moreover, it is an advantage and objective of the present invention to provide vibratory conveyor apparatuses that minimize space requirements, so that vibratory conveyor systems may be installed and deployed in desired locations without space constraints.

In addition, it is an advantage and objective of the present invention to provide vibratory conveyor apparatuses that effectively impact the entirety of the longitudinal horizontal surface.

Specifically, it is an advantage and objective of the present invention to provide vibratory conveyor apparatuses that move material along the longitudinal path of the horizontal surface at the same speed, regardless of distance of the material from the motor.

Moreover, it is an advantage and objective of the present invention to provide vibratory conveyor apparatuses that are immune to changes caused by differences in material loading.

More specifically, it is an advantage and objective of the present invention to provide vibratory conveyor apparatuses that can be set and operate the same no matter the material moving thereon.

Further, it is an advantage and objective of the present invention to provide vibratory conveyor apparatuses that are not reliant or solely reliant on the control of the speed of the vibratory motor to increase or decrease the speed of material moving on the bed.

Still further, it is an advantage and objective of the present invention to provide vibratory conveyor apparatuses that control speed by lengthening or shortening of one or more deflectors, maintaining constant speed of the vibratory motors thereon.

Additional features and advantages of the present invention are described in, and will be apparent from, the detailed description of the presently preferred embodiments and from the drawings.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION OF THE PRESENTLY PREFERRED EMBODIMENTS

The present invention relates to bi-directional vibratory conveyor apparatuses. Specifically, vibratory conveyor apparatuses of the present invention comprise an elongated horizontal conveying surface, a vibration inducing motor, and vertically-disposed legs under the horizontal conveying surface, the deflection of which via one or more deflectors in conjunction with vibrations of the horizontal conveying surface by the vibration inducing motor induces directional travel of parts and material on the horizontal conveying surface based on the direction of deflection of the legs therebeneath. Methods of using the same are further provided.

Figure 1:
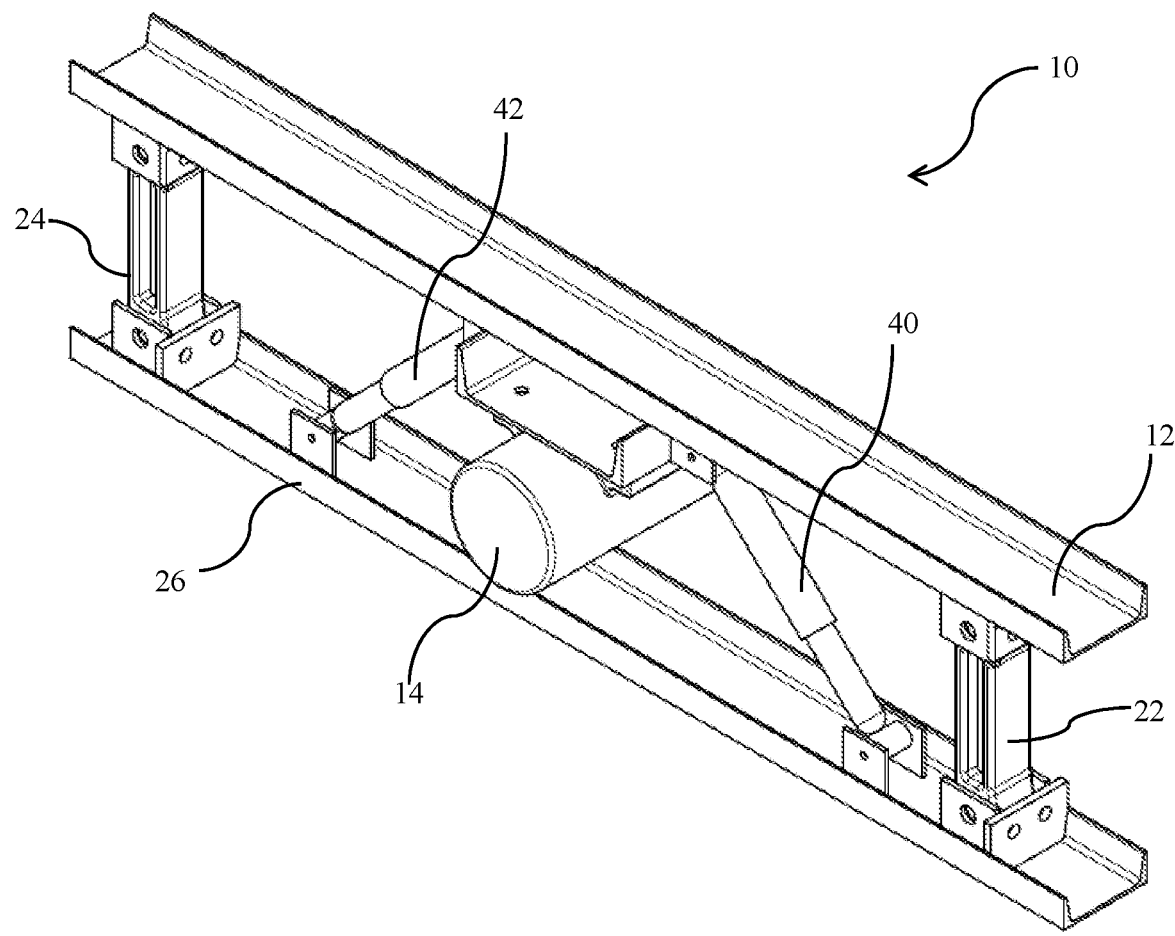
FIG. 1 illustrates a perspective view of a bi-directional vibratory conveyor apparatus in an embodiment of the present invention.
Figure 2:
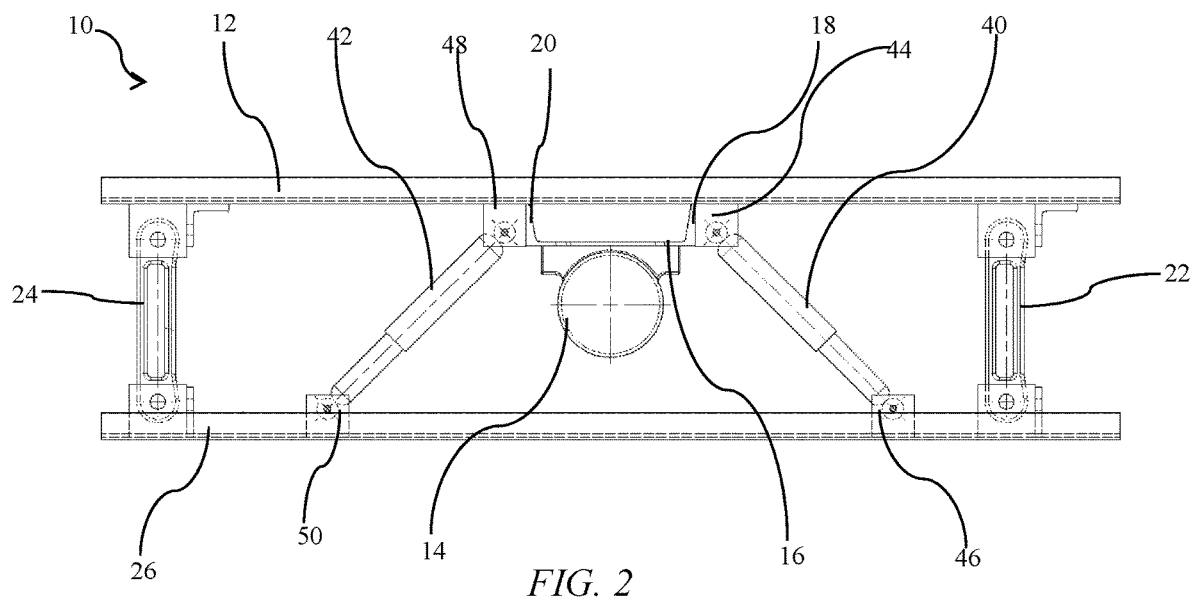
FIG. 2 illustrates a front view of a bi-directional vibratory conveyor apparatus in an embodiment of the present invention.

Referring now to FIGS. 1 and 2, a bi-directional vibratory conveyor apparatus 10 is shown, and described herein. The apparatus 10 comprises a bed 12 on which products, particles, items, or other like material may move. The bed comprises a flat sheet of, preferably metal, disposed generally horizontally over a distance and having sides on edges thereof to maintain material thereon as the material moves on the bed. The bed 12, as shown in FIGS. 1 and 2, is illustrated as truncated, as the bed 12 may be as long as necessary to move material from one location to another thereon by vibrating the bed 12 via a vibrator 14, preferably a motor having an eccentric unbalanced oscillation. It should be noted, however, that the vibration applied to the bed 12 may be accomplished via any known vibrating means, and the present invention should not be limited as described herein.

Figure 3:
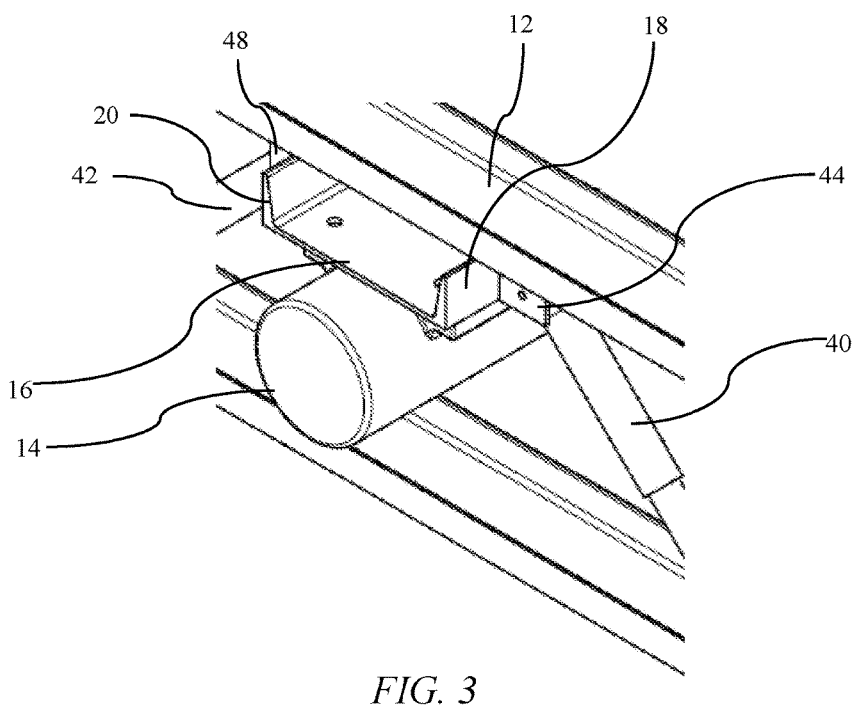
FIG. 3 illustrates a close-up view of a motor connected to a bed on a bi-directional vibratory conveyor apparatus in an embodiment of the present invention.

The vibrator 14 may be attached to a bridge 16, preferably on an underside thereof, wherein legs 18, 20 of the bridge connect to the bed 12, transferring vibration from the vibrator 14 thereto to move material thereon, as illustrated in FIG. 3. Of course, the vibrator 14 may be attached to the bed 12 in any manner apparent to one of ordinary skill in the art to transfer vibration to the bed 12 to move material thereon.

Figure 4:
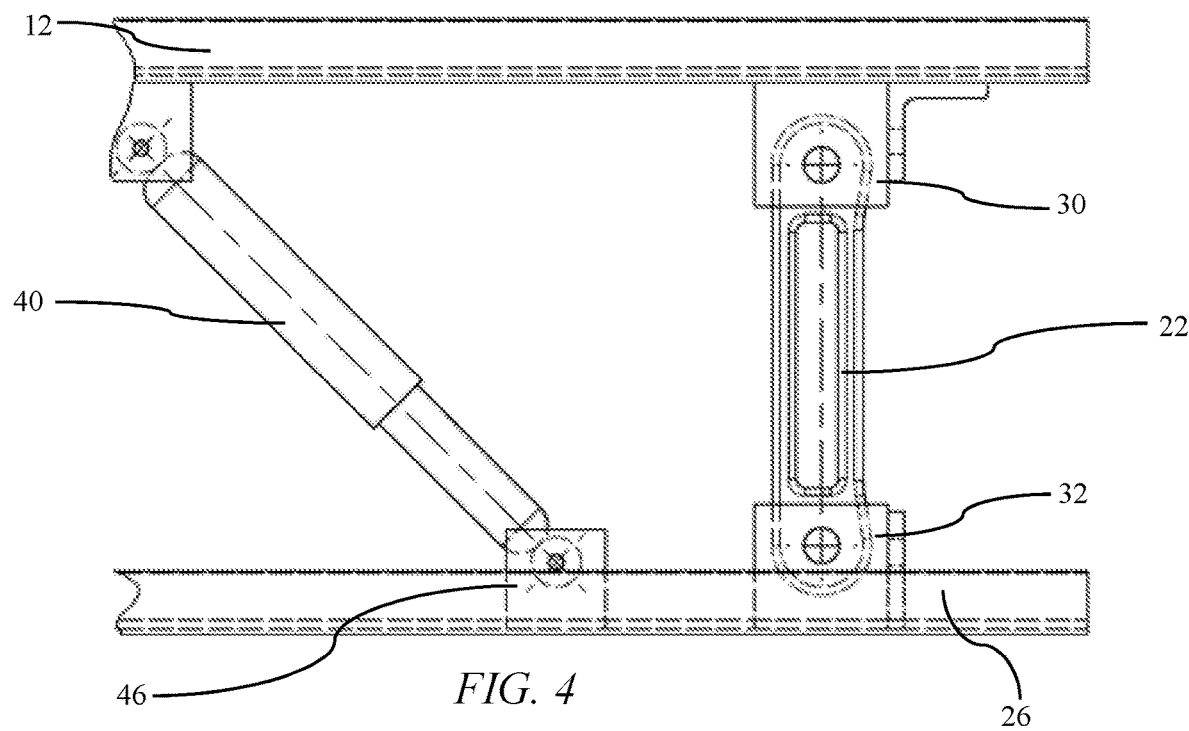
FIG. 4 illustrates a close-up view of a first leg and first deflector connected between a bed and a base on a bi-directional vibratory conveyor apparatus in an embodiment of the present invention.

The apparatus 10 may further comprise a first leg 22 and a second leg 24 disposed on opposite sides of the vibrator 14, and disposed generally vertically to, primarily, support the bed 12. The first and second legs 22, 24 may be attached to an underside of the bed 12 on one end thereof and to a base 26 that may be disposed therebeneath. In a preferred embodiment, the base 26 may be disposed adjacent or on top of the floor surface. In another embodiment, the base 26 may be a floor surface. As illustrated in FIG. 2 and, in close-up in FIG. 4, first leg 22 may be attached to bracket 30 on a top thereof, and to bracket 32 on a bottom thereof that may be connected to the base 26. As illustrated in FIG. 4, the first leg 22 may be bolted thereto, which allows flex of the first leg 22 to the right or to the left, as described in more detail below. Alternatively, the first leg 22 may be attached directly to the underside of the bed 12 and to the base 26 without brackets, as long as the first leg 22 has a degree of flex.

Figure 5:
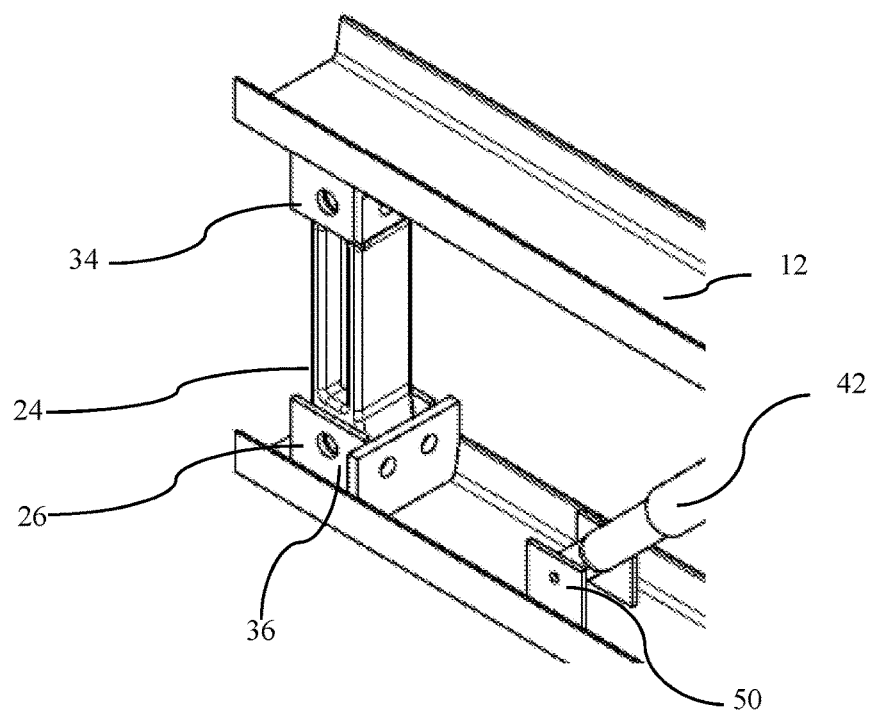
FIG. 5 illustrates a close-up view of a second leg and second deflector connected between a bed and a based on a bi-directional vibratory conveyor apparatus in an embodiment of the present invention.

Likewise, second leg 24, as illustrated in FIGS. 1 and 2 and in close-up in FIG. 5, may be attached to bracket 34 on a top thereof, and to a bracket 36 on a bottom thereof that may be connected to the base 26. As illustrated in FIG. 5, the second leg 24 may be bolted thereto, which allows rotating thereof and, consequently, flex of the second leg 24 to the right or to the left, as described in more detail below. Alternatively, the second leg 24 may be attached directly to the underside of the bed 12 and to the base 25 without brackets, as long as the second leg 24 has a degree of flex thereto.

The first and second legs 22, 24 may be made from any material strong enough to provide support, yet also provide the necessary flex to cause the material on the bed 12 to move either one direction or the other depending on the direction of flex of the first and second legs 22, 24. Specifically, the legs 22, 24 may be made from metal, composite material, wood, or any other like material that is strong and resilient to withstand forces applied thereto, but further allows flexibility to deflect, as described below. It should also be noted that there may be more than two legs, and the number of legs supporting the bed 12 may be determined based on the length of the bed 12 for moving material thereon. However, the legs supporting bed 12 may all have the property of being flexible when force is applied thereto, either flexing in one direction simultaneously or in the other direction simultaneously.

The forces imparted to the bed 12 to move material in one direction or the other direction on the bed 12 may be created by a combination of the vibration from the vibrator 14 and deflection of the bed 12 and legs 22, 24 by first and second deflectors 40, 42. First and second deflectors 40, 42 may impart a horizontal force on the bed 12 in one direction or the other and, in combination with the vibration of the vibrator 14 and consequent deflection of legs 22, 24, may drive material on the bed 12 in one direction or the other, depending on the deflection of the bed 12. For example, in the examples of the apparatuses shown in the figures and from the same direction of viewing, a deflection of the bed 12 in the right direction causes movement of the material on the bed 12 in the left direction, when the vibrator 14 induces vibrations thereto. Likewise, deflection of the bed 12 in the left direction causes movement of the material on the bed in the right direction when the vibrator 14 induces vibrations thereto. Thus, material on the bed 12 moves in the opposite direction on the bed 12 to the direction of the deflection imparted to the bed 12 by the deflectors 40, 42.

Specifically, first deflector 40 may be connected, on a first end thereof, to the bed 12 via bracket 44 on an underside of the bed 12, and, on a second end thereof, to the base 26 via bracket 46. Likewise, the second deflector 42 may be connected, on a first end thereof, to the bed 12 via bracket 48 on an underside of the bed 12, and, on a second end thereof, to the base 26 via bracket 50.

The first deflector 40 may be disposed on an angle from the base 26 to the bed 12, as shown in FIGS. 2 and 4. Specifically, the first deflector 40 may extend at any practical angle from near the first leg 22 on the base 26 toward the bridge 16 on the underside of the bed 12. In addition, second deflector 42 may be disposed on an angle from the base 26 to the bed 12, as shown in FIGS. 2 and 5. Similar to the first deflector 40, the second deflector 42 may extend at any practical angle from near the second leg 24 on the base 26 toward the bridge 16 on the underside of the bed 12.

The deflectors 40, 42 may simultaneously impart a force on the bed 12, thereby causing the legs 22, 24 to flex in response to the force applied thereto. The force applied to the bed 12 may thus cause material on the bed 12 to move in one direction or the other depending on the direction of the force applied thereto by the deflectors 40, 42. For example, if material is desired to move to the left on the apparatus 10 illustrated in FIGS. 1 and 2, first deflector 40 may impart a force to the bed 12 by shortening itself, whereas second deflector 42 may further apply a force in the same direction by lengthening, causing the bed 12 to deflect to the right. Coupled with the vibrations caused by the vibrator 14, material on the bed 12 may thus move toward the left. Likewise, if material is desired to move to the right on the apparatus 10 illustrated in FIG. 3, first deflector 40 may impart a force to the bed 12 by lengthening itself, whereas second deflector 42 may further apply a force in the same direction by shortening, causing the bed 12 to deflect to the left. Coupled with the vibrations caused by the vibrator 14, material on the bed 12 may thus move to the right.

The deflectors 40, 42 may be any type of apparatus, device or mechanism apparent to one of ordinary skill in the art to move or deflect the bed 12 in one direction or the other, and may include for example, as illustrated in FIGS. 1-6, pneumatic pistons that may shorten and/or lengthen as needed. It should also be noted that the direction of positioning of the deflectors 40, 42 may be reversed, and force applied to the bed 12 as noted above by reversing the lengthening and shortening of the respective deflectors. Moreover, in an alternate embodiment of the present invention, the legs and deflectors may be separate elements, as described herein, or may be a combined element, having the functionality of both supporting the bed 12 and deflecting the bed 12, and the present invention should not be limited as described herein.

Moreover, lengthening and shortening the deflectors 40, 42, as described herein, may also impact the speed of material moving on the bed 12. For example, additional shortening of the first deflectors 40 and additional lengthening of the second deflector 42 may cause the speed of material moving to the left to increase. Likewise, additional shortening of the second deflector 42 and additional lengthening of the first deflector 40 may cause the speed of material moving to the right to increase. Thus, the speed of material moving on the bed 12 may increase or decrease based on the relative lengths of the deflectors 40, 42, maintaining the vibrator 14 at a constant speed.

As noted above, any number of legs may be used to support the bed 12 for the entirety of the length of the bed 12, and the present invention, utilizing the combination of the vibrator 14 and deflectors 40, 42 may cause material to move in one direction or the other based on the force applied to the bed 12 by the deflectors along the entirety of the length of the bed 12. Thus, all legs may be deflected by the forces applied to the bed 12 by the deflectors 40, 42, causing the material to continuously move along bed 12 no matter the distance from the vibrator 14. In present vibratory conveyor systems, the efficiency of moving material along the bed decreases the further the material moves from the vibrator 14. In the present invention, the material moves as efficiently or nearly as efficiently any distance away from the vibrator 14 as adjacent the vibrator 14. Therefore, the bed 12 may be any length necessary to move material to desired locations as there are no length restrictions of the bed 12 in the present invention.

A control system (not shown) may be utilized to control both the vibrator 14 and the deflectors 40, 42 to cause the material to move along the bed. Specifically, the control system may be configured to impart the desired force to the bed 12 via the deflectors 40, 42 to cause the material to move in the desired direction. Moreover, the vibrations imparted by the vibrator 14 may be controlled to speed or slow the movement of material; likewise, the degree of force applied to the bed 12 by the deflectors 40, 42 may also aid in controlling the speed of movement of material thereon. In a preferred embodiment, the vibrator 14 may be maintained at a constant speed and the relatively lengths of the deflectors 40, 42 may be controlled to cause the material to move in a desired direction and at a desired speed.

Figure 7:
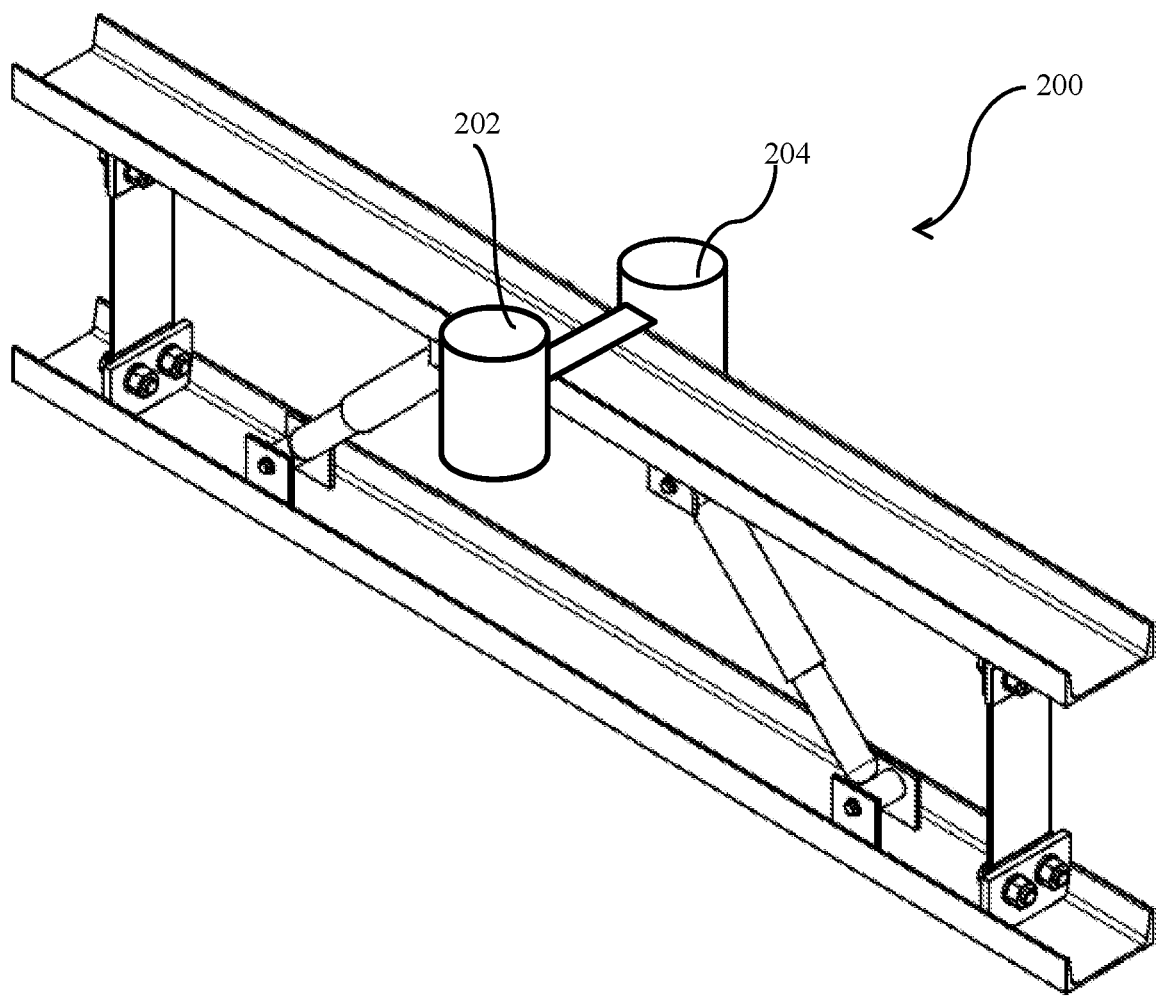
FIG. 7 illustrates a perspective view of a bi-directional vibratory conveyor apparatus having a plurality of motors in an alternate embodiment of the present invention.

Thus, the movement of material on the bed 12 may be controlled via use of a single vibrator 14, such as a single motor, without requiring reversal of the motor to change direction of material moving thereon. Although a single motor is preferred, it should be noted that a plurality of motors may be used to control the movement of material on the bed 12, and the present invention should not be limited as described herein. For example, FIG. 7 illustrates a vibratory conveyor apparatus 200 having a first motor 202 and a second motor 204, each of which may impart vibrations to the apparatus 200. In addition, the vibrator 14, the legs 22, 24, and the deflectors 40, 42 may take up less space that the mechanisms of typical vibratory conveyor apparatuses heretofore known, thereby allowing for the placement and use of the apparatus 10 in locations heretofore unavailable. In addition, as noted above, efficiency of movement of material in one direction or the other may be maintained no matter the distance from where the vibrator 14 is mounted to the bed 12.

Figure 6:
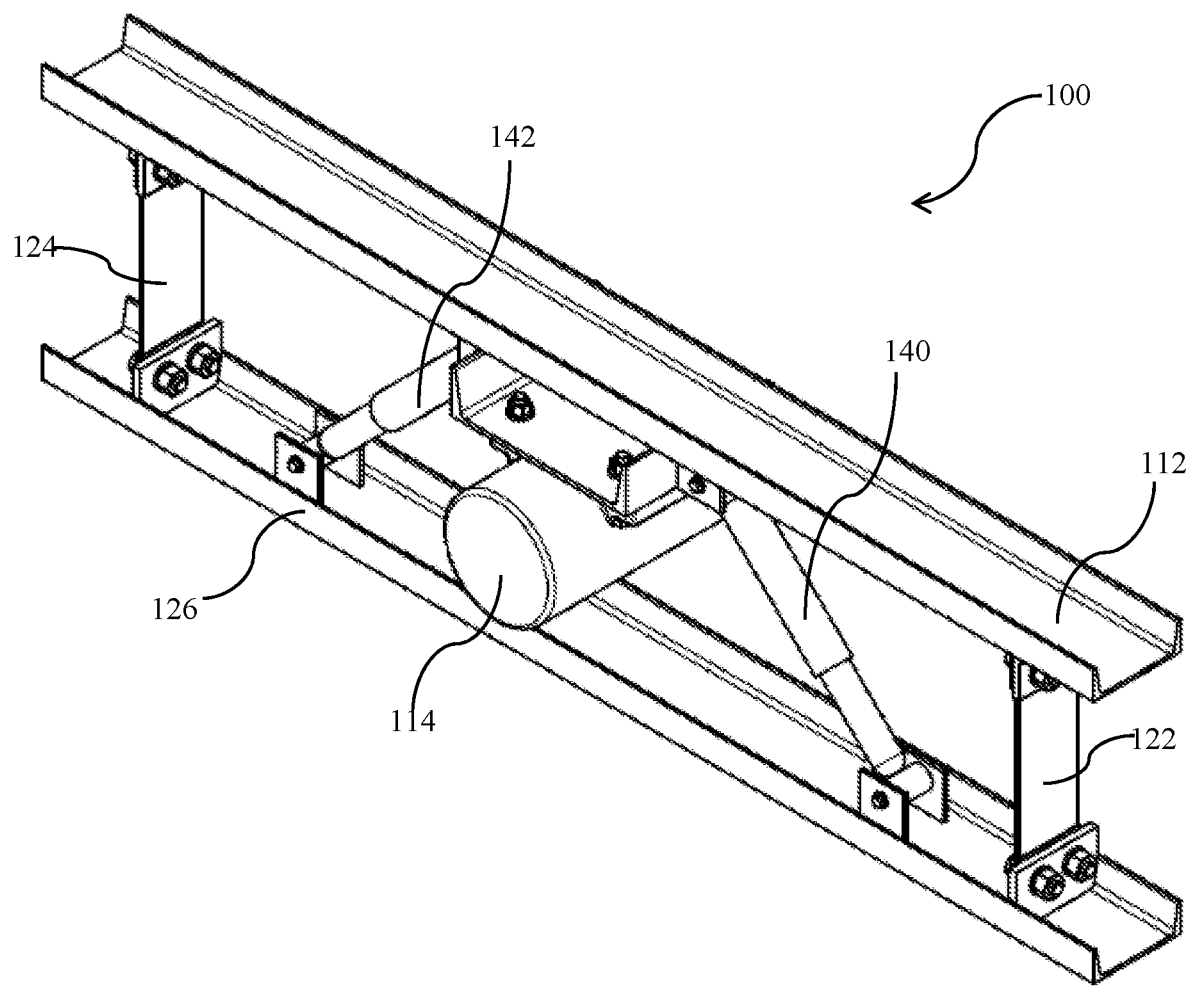
FIG. 6 illustrates a perspective view of a bi-directional vibratory conveyor apparatus in an alternate embodiment of the present invention.

FIG. 6 illustrates an alternate embodiment of the present invention of a bi-directional conveyor apparatus 100 comprising a bed 112 on which products, particles, items, or other like material may move, as described above with respect to bi-directional conveyor apparatus 10. The bed 12 may comprise a flat sheet of, preferably metal, disposed generally horizontally over a distance and having sides on edges thereof to maintain material thereon as the material moves on the bed. The bed 112, as shown in FIG. 6, is illustrated as truncated, as the bed 112 may be as long as necessary to move material from one location to another thereon by vibrating the bed 12 via a vibrator 14, preferably a motor having an eccentric unbalanced oscillation. It should be noted, however, that the vibration applied to the bed 112 may be accomplished via any known vibrating means, and the present invention should not be limited as described herein.

The apparatus 100 may further comprise a first leg 122 and a second leg 124 disposed on opposite sides of the vibrator 114, and disposed generally vertically to, primarily, support the bed 112. The first and second legs 122, 124 may be similar to the legs 22, 24, described above, but may be thin slats of material, such as metal, fiberglass, wood, composite material, plastic, or other like material, that may flex when force is applied thereto.

As with legs 22, 24, the first and second legs 122, 124 may be attached to an underside of the bed 112 on one end thereof and to a base 126 that may be disposed therebeneath. In a preferred embodiment, the base 126 may be disposed adjacent or on top of the floor surface. In another embodiment, the base 126 may be a floor surface.

Bi-directional conveyor apparatus 100 may thus work in a similar manner as the bi-directional conveyor apparatus 10, described above, with first and second deflectors 140, 142 moving the bed 112, and thus flexing and deflecting legs 140, 142 in one direction or the other based on alternatively lengthening and shortening the deflectors 140, 142. Couple with vibrations to the bed 112 caused by the vibrator 114, material on the bed 112 may move in one direction or the other, as desired.

It should be noted that various changes and modifications to the presently preferred embodiments described herein will be apparent to those skilled in the art. Such changes and modifications may be made without departing from the spirit and scope of the present invention and without diminishing its attendant advantages. Further, references throughout the specification to "the invention" are non-limiting, and it should be noted that claim limitations presented herein are not meant to describe the invention as a whole. Moreover, the invention illustratively disclosed herein suitably may be practiced in the absence of any element which is not specifically disclosed herein.

I claim:

1. A vibratory conveyor apparatus for moving material on a surface comprises:
    a bed on which material is configured to move in a first direction or a second direction opposite the first direction;
    a base positioned beneath the bed;
    first and second legs disposed from the base to the bed, each of the first and second legs having a fixed length;
    a first vibratory motor configured to impart vibrations to the bed; and
    a first deflector connected to the bed, configured to move the bed in the first direction or the second direction, wherein lengthening the first deflector causes the first and second legs to deflect in the second direction and the material to move in the first direction, and shortening the first deflector causes the first and second legs to deflect in the first direction and the material to move in the second direction.

2. The vibratory conveyor apparatus of claim 1 wherein the first and second legs are connected to an underside of the bed.

3. The vibratory conveyor apparatus of claim 1 further comprising a second deflector connected to the bed, configured to move the bed in the first direction or the second direction.

4. The vibratory conveyor apparatus of claim 3 wherein the first deflector is connected to the bed at a first angle from the base and the second deflector is connected to the bed at a second angle from the base, wherein the second angle opposes the first angle.

5. The vibratory conveyor apparatus of claim 3 wherein lengthening the first deflector and shortening the second deflector causes the material to move in the first direction on the bed via vibrations from the vibratory motor.

6. The vibratory conveyor apparatus of claim 5 wherein shortening the first deflector and lengthening the second deflector causes the material to move in the second direction on the bed via vibrations from the vibratory motor.

7. The vibratory conveyor apparatus of claim 1 wherein the bed comprises a length, a first side extending vertically from flat sheet and an opposing second side extending vertically from the flat sheet.

8. The vibratory conveyor apparatus of claim 1 wherein the first deflector is a pneumatic piston.

9. The vibratory conveyor apparatus of claim 1 further comprising:
    a second vibratory motor configured to impart vibrations to the bed.

10. A method of moving material from one location to another comprising the steps of:
    providing a vibratory conveyor apparatus for moving material on a surface comprising a bed on which material is configured to move in a first direction or a second direction opposite the first direction, a base positioned beneath the bed, first and second legs extending from the base to the bed, each of the first and second legs having a fixed length, a first vibratory motor configured to impart vibrations to the bed, and a first deflector connected to the bed configured to move the bed in the first direction or the second direction;
    placing material on the bed;
    changing the length of the first deflector causing the first and second legs to deflect; and
    imparting vibrations to the bed from the first vibratory motor, thereby moving the material on the bed in the first direction or the second direction.

11. The method of claim 10 further comprising the step of:
    providing a second deflector connected to the bed configured to move the bed in the first direction or the second direction.

12. The method of claim 11 further comprising the steps of:
  shortening the first deflector and lengthening the second deflector to move the bed in the first direction; and
  moving the material on the bed in the second direction.

13. The method of claim 11 wherein the first deflector is connected to the bed at a first angle and the second deflector is connected to the bed at a second angle, wherein the second angle opposes the first angle.

14. The method of claim 10 wherein the first and second legs are connected to an underside of the bed.

15. The method of claim 10 wherein the bed comprises a length, a first side extending vertically from flat sheet and an opposing second side extending vertically from the flat sheet.

16. The method of claim 10 wherein the first deflector is a pneumatic piston.

17. The method of claim 10 further comprising the steps of:
  providing a second vibratory motor configured to impart vibrations to the bed; and
  imparting vibrations to the bed via the second vibratory motor.

18. The method of claim 10 further comprising the step of:
  deflecting the first and second legs in the first direction by moving the bed in the first direction with the first deflector.

19. The method of claim 18 further comprising the step of:
  deflecting the first and second legs in the second direction by moving the bed in the second direction with the first deflector.

20. A vibratory conveyor apparatus for moving material on a surface comprising:
  a bed on which material is configured to move in a first direction or a second direction opposite the first direction;
  a base positioned beneath the bed;
  first and second legs disposed from the base to the bed;
  a first vibratory motor configured to impart vibrations to the bed;
  a first deflector connected to the bed, configured to move the bed in the first direction or the second direction; and
  a second deflector connected to the bed, configured to move the bed in the first direction or the second direction,
  wherein the first deflector is connected to the bed at a first angle from the base and the second deflector is connected to the bed at a second angle from the base, wherein the second angle opposes the first angle.

21. A vibratory conveyor apparatus for moving material on a surface comprising:
  a bed on which material is configured to move in a first direction or a second direction opposite the first direction;
  a base positioned beneath the bed;
  first and second legs disposed from the base to the bed;
  a first vibratory motor configured to impart vibrations to the bed;
  a first deflector connected to the bed, configured to move the bed in the first direction or the second direction; and
  a second deflector connected to the bed, configured to move the bed in the first direction or the second direction,
  wherein lengthening the first deflector and shortening the second deflector causes material to move in the first direction on the bed via vibrations from the vibratory motor.

22. The vibratory conveyor apparatus of claim 21 wherein shortening the first deflector and lengthening the second deflector causes the material to move in the second direction on the bed via vibrations from the vibratory motor.

23. A method of moving material from one location to another comprising the steps of:
  providing a vibratory conveyor apparatus for moving material on a surface comprising a bed on which material is configured to move in a first direction or a second direction opposite the first direction, a base positioned beneath the bed, first and second legs extending from the base to the bed, a first vibratory motor configured to impart vibrations to the bed, a first deflector connected to the bed configured to move the bed in the first direction or the second direction, and a second deflector connected to the bed configured to move the bed in the first direction or the second direction;
  placing material on the bed;
  shortening the first deflector and lengthening the second deflector to move the bed in the first direction; and
  imparting vibrations to the bed from the first vibratory motor, thereby moving material on the bed in the second direction.

24. A method of moving material from one location to another comprising the steps of:
  providing a vibratory conveyor apparatus for moving material on a surface comprising a bed on which material is configured to move in a first direction or a second direction opposite the first direction, a base positioned beneath the bed, first and second legs extending from the base to the bed, a first vibratory motor configured to impart vibrations to the bed, a first deflector connected to the bed configured to move the bed in the first direction or the second direction, and a second deflector connected to the bed configured to move the bed in the first direction or the second direction, wherein the first deflector is connected to the bed at a first angle and the second deflector is connected to the bed at a second angle, wherein the second angle opposes the first angle;
  placing material on the bed;
  using the first deflector to move the bed in the first direction; and
  imparting vibrations to the bed from the first vibratory motor, thereby moving the material on the bed in the second direction.

\* \* \* \* \*